United States Patent Office 3,595,733
Patented July 27, 1971

3,595,733
METHOD OF PREPARING ALPHA-UNSATURATED ORGANOSILICON COMPOUNDS
Anna C. Ching and John L. Speier, Midland, Mich., assignors to Dow Chemical Corporation, Midland, Mich.
No Drawing. Filed July 9, 1969, Ser. No. 840,472
Int. Cl. C07f *7/08, 7/18;* C08g *31/22*
U.S. Cl. 260—448.2E           3 Claims

ABSTRACT OF THE DISCLOSURE

Organosilicon compounds having the structure $$\equiv SiCH=CHR$$

are prepared by reacting $\equiv SiH$ with $CH_2=CHR$ in the presence of catalytic osmium such as chloroosmic acid, or metallic osmium in finely divided form. The by-product is an alkane of the formula $CH_3CH_2R$. For example, trichlorosilane plus ethylene gives vinyltrichlorosilane plus ethane.

---

The present invention provides a novel and unique method of preparing organosilicon compounds having alpha-unsaturation without producing undesirable organosilicon by-products. It has been found that when osmium is used as a catalyst for the addition of olefins of the type defined below to SiH compounds, the product is exclusively an alkenyl-substituted silicon compound in which the unsaturation is on the alpha-carbon. The other product involved is a saturated compound. Thus, for example, when SiH is added to a vinyl-silane the products obtained are a silcarbane having the $\equiv SiCH=CHSi\equiv$ linkage and an ethylsilane. When the olefin employed is free of silicon the products obtained are a silane containing the above group and a saturated hydrocarbon.

Other methods used to prepare silanes having unsaturation alpha- to the silicon involve either a dehydrohalogenation of a beta-halo compound such as, for example, the reaction of vinylchloride with SiH to produce vinyl groups or the addition of acetylene to SiH compounds. Both of these methods leave much to be desired.

It is the object of this invention to provide a novel method of preparing vinylorganosilicon compounds and to also provide a novel method for preparing other organosilicon compounds containing the $\equiv SiC=CR$ group.

This invention relates to the method comprising reacting a compound (1) containing at least one $\equiv SiH$ group with a compound of the formula (2) $CH_2=CHR$ in the presence of an osmium catalyst at a temperature sufficient to form a compound having the group (3) $\equiv SiCH=CHR$ in which R is hydrogen, a hydrocarbon radical or a silyl-substituted hydrocarbon radical, the remaining valences of the silicon atoms in (1), (2) and (3) being substituted with hydrogen atoms, hydrocarbon radicals free of aliphatic unsaturation, halohydrocarbon radicals free of aliphatic unsaturation and in which the halogen on at least the third carbon atom from the Si, alkoxy groups, halogen atoms or oxygen atoms of SiOSi linkages.

The temperature at which the above reaction is carried out is not critical, although in general, temperatures of at least 50° C. or above are required for reasonable rates of reaction. The upper temperature limit is not critical, except, of course, the temperature should be below the decomposition point of the starting materials or the desired product.

The pressure at which the reaction of this invention is carried out is not critical and can be sub-atmospheric, atmospheric, or super-atmospheric. Obviously, in those cases in which either of the reactants is a gas it is preferable that the reaction be carried out at super-atmospheric pressure.

For the purpose of this invention the catalyst can be osmium in any finely divided state. This includes the finely divided metal, either alone or on support such as carbon black, alumina, or asbestos; or compounds of osmium such as bromo-osmic acid, complexes of osmium with olefins, and osmium chloride.

Reactant (1) of this invention is an organosilicon compound containing at least one SiH group. If desired, the compound can contain more than one SiH linkage. Thus, $\equiv SiH_x$ compounds can give two or more $-CH=CR$ groups per silicon atom or per molecule depending upon the location of the SiH. If one uses less than the stoichiometric amount of olefin one can produce a compound which still retains SiH groups. For example, one mol of dichlorosilane reacted with a half mol of ethylene would give the compound vinyldichlorosilane.

Reactant (1) can either be silane or a siloxane and the siloxanes can be those which have hydrogen on all or part of the silicon atoms in the molecule. Siloxane (1) can be either a homopolymer or a copolymer.

The substituents on the silicon, in addition to SiH, can be any monovalent hydrocarbon radical free of aliphatic unsaturation, such as alkyl radicals such as methyl, ethyl, isopropyl, butyl or octadecyl; cycloaliphatic radicals such as cyclohexyl or cyclopentyl; aryl hydrocarbon radicals such as phenyl, tolyl, xylyl, xenyl or naphthyl; and aralky hydrocarbon radicals such as benzyl, beta-phenylethyl, or beta-phenylpropyl. The silicon atoms can also be substituted with any monovalent halohydrocarbon radical free of aliphatic unsaturation, such as gamma-chloropropyl, chlorophenyl, dibromophenyl, bromoxenyl, alpha, alpha, alpha-trifluorotolyl, 3,3,3-trifluoropropyl, chlorocyclohexyl or bromotolyl. The halogen should be no closer to the Si than the third carbon atom, i.e., there should be no halogen on the alpha and beta carbon atoms.

The silicon atoms can also be substituted with any halogen atoms such as fluorine, bromine, chlorine or iodine; or any alkoxy group such as methoxy, isopropoxy, hexyloxy, octadecyloxy, beta-methoxyethoxy, $$-OCH_2CH_2OCH_2CH_2OEt$$

and beta-methoxypropoxy.

The olefin employed in this invention can be any hydrocarbon olefin such as ethylene, propylene, butylene, octadecylene, isobutylene, styrene, vinyltoluene, vinylxylene, vinyldiphenyl, vinylcyclohexane or allylbenzene. The olefin can also have silyl-substitution. Thus, for example, compound (2) could be a vinyl-substituted siloxane, an allyl-substituted siloxane, a hexenyl-substituted silane or a styryl-substituted silane. The silicon atom in the silyl-substituted olefins can be substituted with any of the groups shown for the silicon atoms of (1).

The products of this invention are useful for any of the uses for which silanes and siloxanes are normally employed.

The following examples are illustrative only and should not be construed as limiting the invention which is properly delineated in the appended claims.

Example 1

A mixture of 3.6 ml. of bis-trimethylsiloxy methyl silane and 3 ml. of bis-trimethylsiloxy methyl vinylsilane and 10 microliters of chloroosmic acid dissolved in ethanol at a concentration of 1% by weight of osmium was heated 16 hours at 100° C. in a closed vessel. There was obtained a 93% yield of the product $$(Me_3SiO)_2MeSiCH=CHSiMe(OSiMe_3)_2$$

having the following properties: $n_D^{25}$ 1.4066, $d_4^{25}$ 0.8720, $R_D$ found 0.2821, calc. 0.2828.

The structure of the compound was established by infrared and NMR spectral analysis.

Example 2

A mixture of 0.1 mol of methyldichlorosilane, 0.25 mol of vinylmethyldichlorosilane and 200 microliters of the catalyst of Example 1 was heated in a closed vessel at 120° C. for 20 hours. There was obtained the compound $MeCl_2SiCH=CHSiMeCl_2$. The structure of the product was determined by infrared and NMR analysis.

Example 3

A mixture of .0037 mol bis-trimethylsiloxy methyl silane, .0029 mol of isopropyl dimethyl vinylsilane and 5 microliters of the catalyst of Example 1 were heated in a closed vessel at 100° C. for 16 hours, there was obtained the compound $(Me_3SiO)_2MeSiCH=CHSiMe_2(CHMe_2)$. This product was identified by mass spectral analysis.

Example 4

0.011 mol of bis-trimethylsiloxy methyl silane, 0.0221 mol of tris-trimethylsiloxy vinyl silane and 15 microliters of the catalyst of Example 1 were heated at 150° C. for 20 hours in a closed vessel. The compound $$(Me_3SiO)_2MeSiCH=CHSi(OSiMe_3)_3$$

was obtained. It was identified by NMR analysis.

Example 5

0.040 mol of bis-trimethylsiloxy methyl silane, 0.069 mol of hexene-1 and 100 microliters of the catalyst of Example 1 were heated in a closed vessel 20 hours at 125° C. The product $(Me_3SiO)_2MeSiCH=CHC_4H_9$ was obtained. It was identified by infrared and NMR spectral analysis.

Example 6

A mixture of 0.005 mol of bis-trimethylsiloxy methyl silane, 0.010 mol of styrene and 20 microliters of the catalyst of Example 1 were heated at 140° C. for 20 hours. There was obtained the compound $$(Me_3SiO)_2MeSiCH=CHC_6H_5$$

This composition had the following properties: B.P. 69 to 70° C. at 10 mm., $n_D^{25}$ 1.4651, $d_4^{25}$ 0.9143, $R_D$ found 0.3025, calc. 0.3027. The structure was further confirmed by infrared and NMR analysis.

Example 7

A mixture of 27.5 ml. (.1 mol) of bis-trimethylsiloxy methyl silane and .2 ml. of the catalyst of Example 1 were placed in a Parr hydrogenation apparatus and heated at 80° C. while ethylene at a pressure of 45 p.s.i. was admitted to the apparatus. The mixture was maintained at 80° C. for 4 days. At the end of this time the product $(Me_3SiO)_2MeSiCH=CH_2$ was obtained.

Example 8

A mixture of 0.011 mol of bis-trimethylsiloxy methyl silane and 0.022 mol of vinyltriethoxysilane were heated in a closed container with 15 microliters of the catalyst of Example 1 at a 150° C. for 20 hours. The product $(Me_3SiO)_2MeSiCH=CHSi(OEt)_3$ was obtained.

Example 9

When the following SiH compounds are reacted with the following olefins in accordance with the procedure of Example 1, the following products are obtained.

| SiH Compound | Olefin | Product |
|---|---|---|
| $H_2SiCl_2$ | 2 mols propylene | $CH_3CH=CHSiHCl_2$. |
| $H_2SiCl_2$ | 4 mols propylene | $(CH_3CH=CH)_2SiCl_2$. |
| $HSiCl_3$ | Ethylene | $CH_2=CHSiCl_3$. |
| $C_{18}H_{37}SiH(OCH_2CH_2OMe)_2$ cyclic | do | $(C_{18}H_{37})CH_2=CHSi(OCH_2CH_2OMe)_2$ cyclic. |
| $(OSiMe_2)_3(OSiMeH)$ | Octadecene | $(C_{16}H_{33}CH=CH)MeSiO(Me_2SiO)_3$. |
| $MeHSiCl_2$ | Ethylene | $(CH_2=CH)MeSiCl_2$. |
| $CF_3CH_2CH_2SiH(OMe)_2$ | Vinylcyclohexane | $(CF_3CH_2CH_2)(C_6H_{11}CH=CH)Si(OMe)_2$. |
| Copolymer of | Vinyl toluene | |
| 10 mol percent $HSiO_{1.5}$ | | 10 mol percent $MeC_6H_4CH=CHSiO_{1.5}$. |
| 10 mol percent $ClC_6H_4SiO_{1.5}$ | | 10 mol percent $ClC_6H_4SiO_{1.5}$. |
| 80 mol percent $PhMeSiO$ | | 80 mol percent $PhMeSiO$. |
| $(HMe_2SiO)_4Si$ | p-Phenyl styrene | $\{(C_6H_5C_6H_4CH=CH)Me_2SiO\}_4Si$. |
| $(MeHSiO)_4$ | Ethylene | $(MeViSiO)_4$. |
| $Me_3SiO(MeHSiO)_{10}SiMe_3$ | $ViSi(OMe)_3$ | $Me_3SiO\{Me(\{Meo\}_3SiCH=CH)SiO\}_{10}SiMe_3$. |

That which is claimed is:

1. The method comprising reacting a compound
   (1) containing at least one ≡SiH group with a compound of the formula
   (2) $CH_2=CHR$ in the presence of chloroosmic acid at a temperature sufficient to form a compound having the group
   (3) ≡SiCH=CHR in which
   R is hydrogen, a hydrocarbon radical or a silyl-substituted hydrocarbon radical, the remaining valences of the silicon atoms in (1), (2) and (3) being substituted with hydrogen atoms, hydrocarbon radicals free of aliphatic unsaturation, halohydrocarbon radicals free of aliphatic unsaturation and in which the halogen is on at least the third carbon from the Si, alkoxy groups, halogen atoms and oxygen atoms of SiOSi linkages.

2. A method in accordance with claim 1 in which (1) is a trichlorosilane and (2) is ethylene.

3. The method in accordance with claim 1 in which (1) is methyldichlorosilane and (2) is ethylene.

References Cited

UNITED STATES PATENTS 2,770,634  11/1956  Weyenberg _____ 260—448.2E
3,198,766  8/1965  Nitzsche et al. _ 260—448.2EUX TOBIAS E. LEVOW, Primary Examiner R. F. SHAVER, Assistant Examiner U.S. Cl. X.R.

260—46.5UA, 448.2Q, 448.2R

U.S. PATENT OFFICE

UNITED STATES PATENT OFFICE

CERTIFICATE OF CORRECTION

Patent No. 3,595,733　　　　　　　　　　Dated: July 27, 1971

ANNA C. CHING and JOHN L. SPEIER

It is certified that errors appear in the above identified patent and that said Letters Patent are hereby corrected as shown below:

Col. 1, line 5 - assignors to "Dow Chemical Corporation"

should read "Dow Corning Corporation"

Col. 4, Table, line 1 under Product -

"$CH_3CH=CHSIHCl_2$" should read "$CH_3CH=CHSiHCl_2$"

Signed and sealed this 21st day of March 1972.

(SEAL)
Attest:

EDWARD M. FLETCHER, JR.　　　　　　　　ROBERT GOTTSCHALK
Attesting Officer　　　　　　　　　　　Commissioner of Patents